United States Patent
Sheng (10) Patent No.: US 10,506,118 B2
(45) Date of Patent: Dec. 10, 2019

(54) IMAGE OUTPUT DEVICE, MULTI-FUNCTION APPARATUS, IMAGE PROCESSING MODULE AND RELATED IMAGE OUTPUT METHOD

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/192,741

(22) Filed: Nov. 15, 2018

(65) Prior Publication Data
US 2019/0297195 A1 Sep. 26, 2019

(30) Foreign Application Priority Data
Mar. 26, 2018 (TW) .............................. 107110232 A (51) Int. Cl.
*H04N 1/00* (2006.01)

(52) U.S. Cl.
CPC ....... *H04N 1/0066* (2013.01); *H04N 1/00702* (2013.01); *H04N 1/00708* (2013.01); *H04N 2201/0094* (2013.01)

(58) Field of Classification Search
CPC . B41F 13/12; B41F 33/0081; G03G 15/5062; G03G 15/556; G03G 15/652; G06F 16/40; G06F 16/58; G06K 15/02; G06K 15/1856; G06K 15/1888; G06K 15/189; G06K 2215/0065; G06K 9/00456; H04N 1/0057; H04N 1/32112; H04N 1/56; H04N 2201/3245; H04N 2201/3277
USPC ........................ 358/1.17, 1.18; 382/236, 306
See application file for complete search history.

(56) References Cited

U.S. PATENT DOCUMENTS

| | | | | |
|---|---|---|---|---|
| 4,748,678 A * | 5/1988 | Takeda | ............... | G06K 9/00456 382/306 |
| 6,333,774 B1 * | 12/2001 | Ito | .............................. | B41J 3/60 355/24 |
| 6,348,975 B1 * | 2/2002 | Tsunekawa | ............ | G06K 15/02 358/1.17 |
| 2004/0118311 A1 * | 6/2004 | Tokiwa | ................... | B41F 13/12 101/485 |

(Continued)

FOREIGN PATENT DOCUMENTS

| CN | 101763004 A | 6/2010 |
|---|---|---|
| CN | 105607879 A | 5/2016 |

(Continued)

*Primary Examiner* — Negussie Worku
(74) *Attorney, Agent, or Firm* — Winston Hsu (57) ABSTRACT

A multi-function apparatus includes a scanning module, a storage module, a printing module and an image processing module electrically connected to the scanning module, the storage module and the printing module. The scanning module is for scanning a scanned object to generate a scanning image having an object graphic corresponding to the scanned object. The storage module is for storing the scanning image. An identification unit of the image processing module is for identifying the object graphic from the scanning image stored in the storage module to obtain a size of the object graphic. A control unit of the image processing module controls the printing module to printing the object graphic onto a predetermined position at a printing medium when the control unit determines that the size of the object graphic is less than a canvas size of the printing medium.

13 Claims, 13 Drawing Sheets

(56) References Cited

U.S. PATENT DOCUMENTS

| | | | |
|---|---|---|---|
| 2010/0177346 A1* | 7/2010 | Mita | G06F 3/1215 |
| | | | 358/1.15 |
| 2016/0243861 A1* | 8/2016 | Fukasawa | B41J 19/20 |
| 2017/0195510 A1* | 7/2017 | Li | H04N 1/0057 |
| 2017/0366704 A1* | 12/2017 | Li | H04N 1/3872 |
| 2018/0293019 A1* | 10/2018 | Sheng | H04N 1/64 |
| 2018/0359385 A1* | 12/2018 | Sheng | H04N 1/02825 |
| 2019/0075209 A1* | 3/2019 | Sheng | H04N 1/04 |
| 2019/0205633 A1* | 7/2019 | Li | G06K 9/00449 |

FOREIGN PATENT DOCUMENTS

| | | |
|---|---|---|
| CN | 105691008 A | 6/2016 |
| CN | 104601852 B | 1/2018 |
| CN | 208724002 U | 4/2019 |
| JP | 2006-39766 A | 2/2006 |
| TW | 201801508 A | 1/2018 |

\* cited by examiner

IMAGE OUTPUT DEVICE, MULTI-FUNCTION APPARATUS, IMAGE PROCESSING MODULE AND RELATED IMAGE OUTPUT METHOD

BACKGROUND OF THE DISCLOSURE

1. Field of the Disclosure

The present disclosure relates to an image output device, a multi-function apparatus, an image processing module and a related image output method, and more particularly, to an image output device, a multi-function apparatus, an image processing module and a related image output method, which are capable of outputting an object graphic at a predetermined position on an output medium.

2. Description of the Prior Art

With advance of the scanning technology, multi-function apparatuses are widely used in families or offices. The multi-function apparatus with scanning capability can capture images of physical objects, such as documents, photographs and books. The digital images can be displayed on and stored in computer devices. Since the digital images of the physical objects can be stored permanently, it is not required to store the physical objects anymore, which can save space occupied by the physical objects. Furthermore, it is easy for a user to edit or transfer the images. Therefore, the multi-function apparatus with scanning capability has an extensive range of applications.

Figure 1:
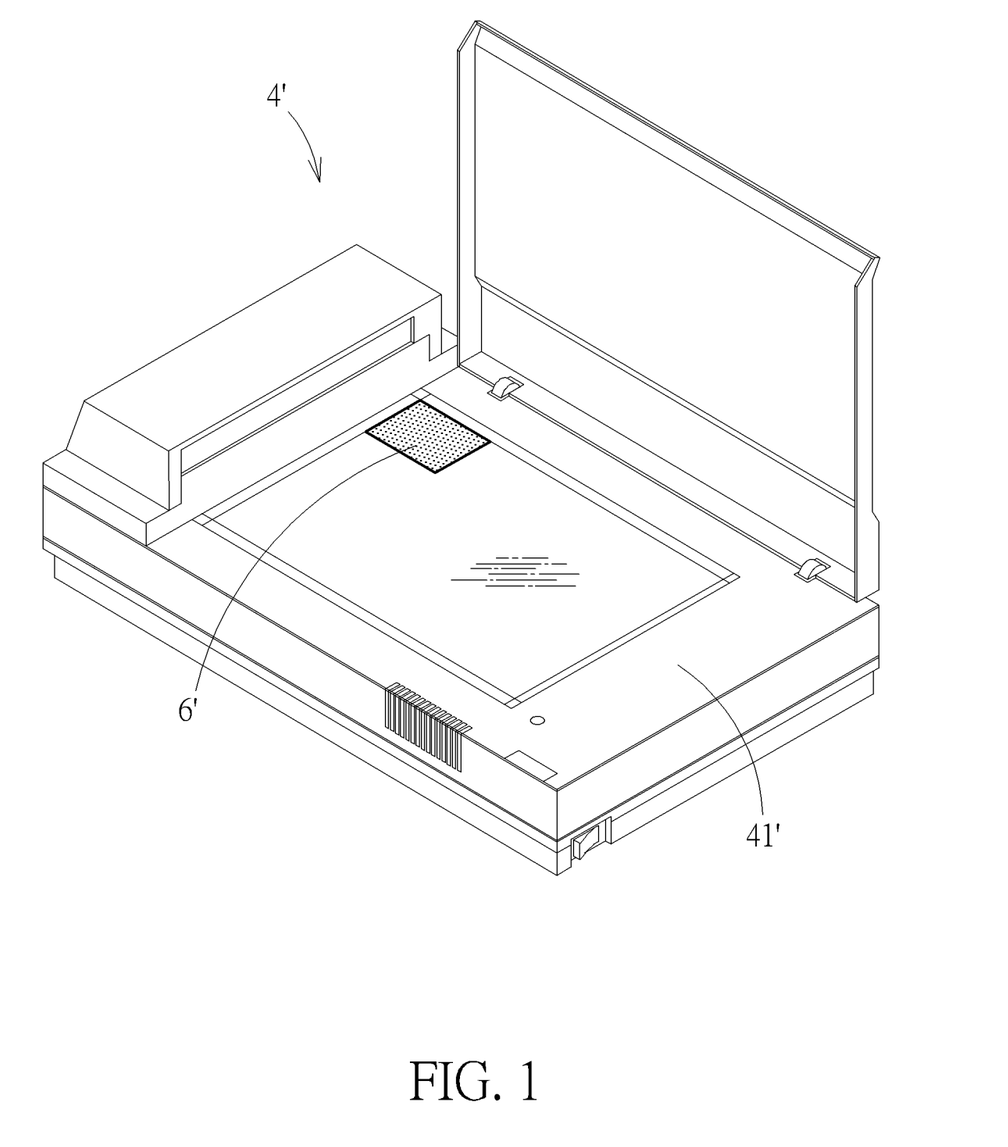
FIG. 1 is a scanning diagram of a multi-function apparatus in the prior art.
Figure 2:
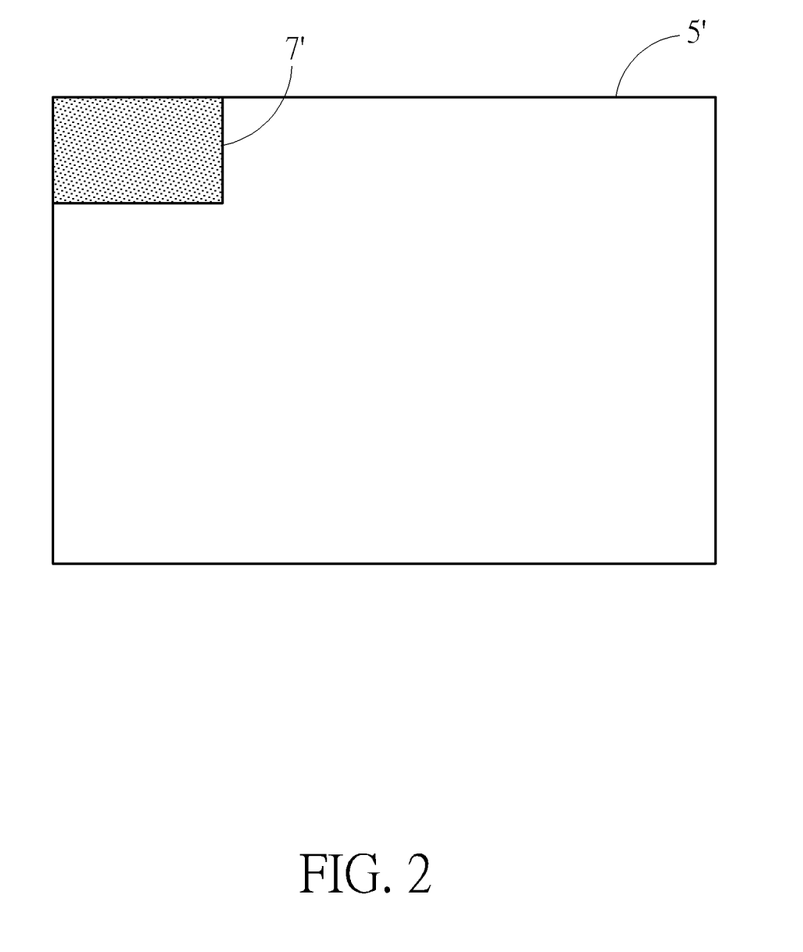
FIG. 2 is a diagram of an output medium outputted by the multi-function apparatus shown in the FIG. 1 in the prior art.

The multi-function apparatus is usually equipped with a plurality of sensors disposed on a bezel of a scanning platform, for detecting a size of a scanned object which is placed on the scanning platform, so as to output an object graphic corresponding to the scanned object on a sheet of paper or an image file according to the size of the scanned object. However, the scanned object has to be placed on a designated position corresponding to configuration of the sensors during a scanning process. For example, please refer to FIG. 1 and FIG. 2. FIG. 1 is a scanning diagram of a multi-function apparatus 4' in the prior art. FIG. 2 is a diagram of an output medium 5' outputted by the multi-function apparatus 4' shown in the FIG. 1 in the prior art. As shown in FIG. 1 and FIG. 2, a scanned object 6' has to be placed on a designated position, i.e., an upper-left corner of a scanning platform 41' of the multi-function apparatus 4', so that a plurality of sensors disposed on a bezel of the scanning platform 41' can correctly detect a size of the scanned object 6', so as to correctly output an object graphic 7' corresponding to the scanned object 6' on an upper-left corner of the output medium 5', such as a sheet of paper or an image file. Furthermore, such multi-function apparatus has high manufacturing cost because of the sensors.

Figure 3:
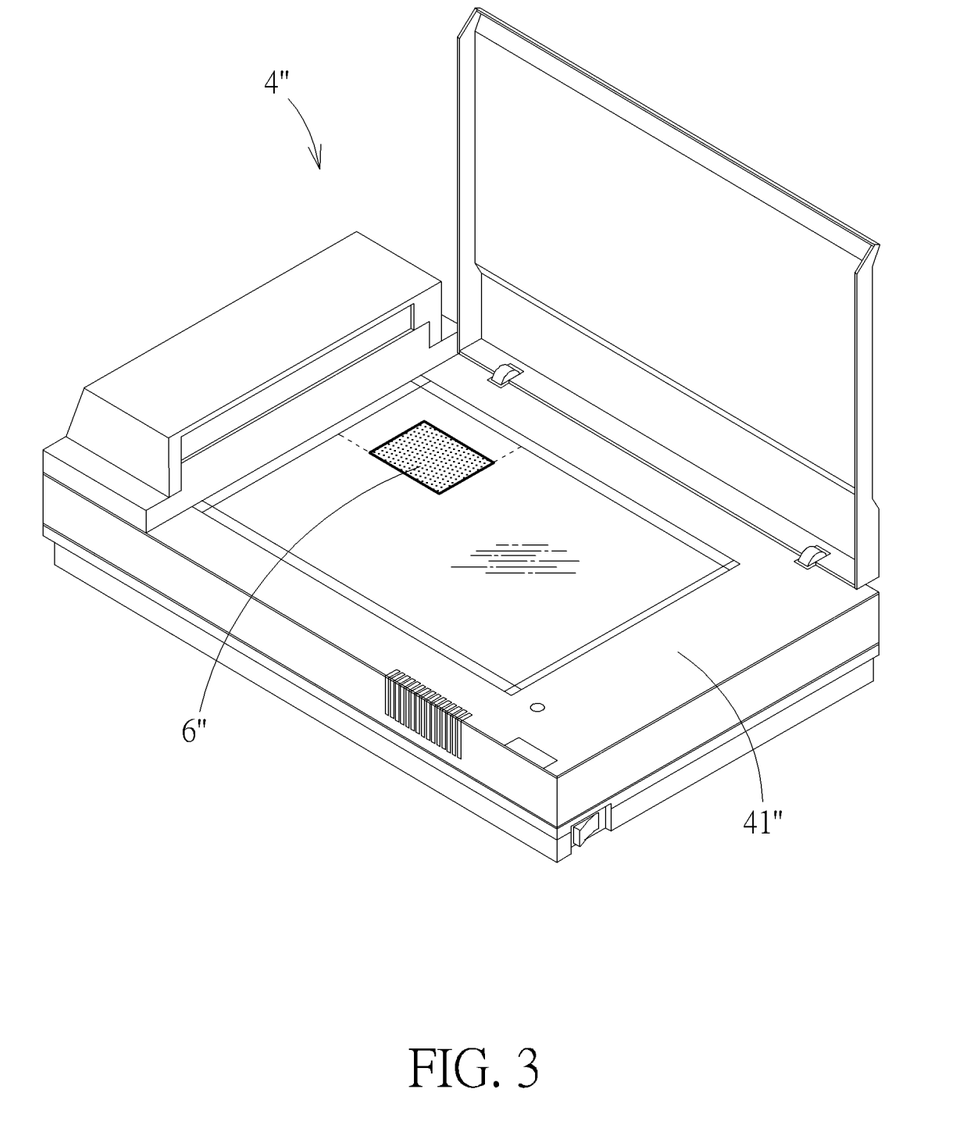
FIG. 3 is another scanning diagram of a multi-function apparatus in the prior art.
Figure 4:
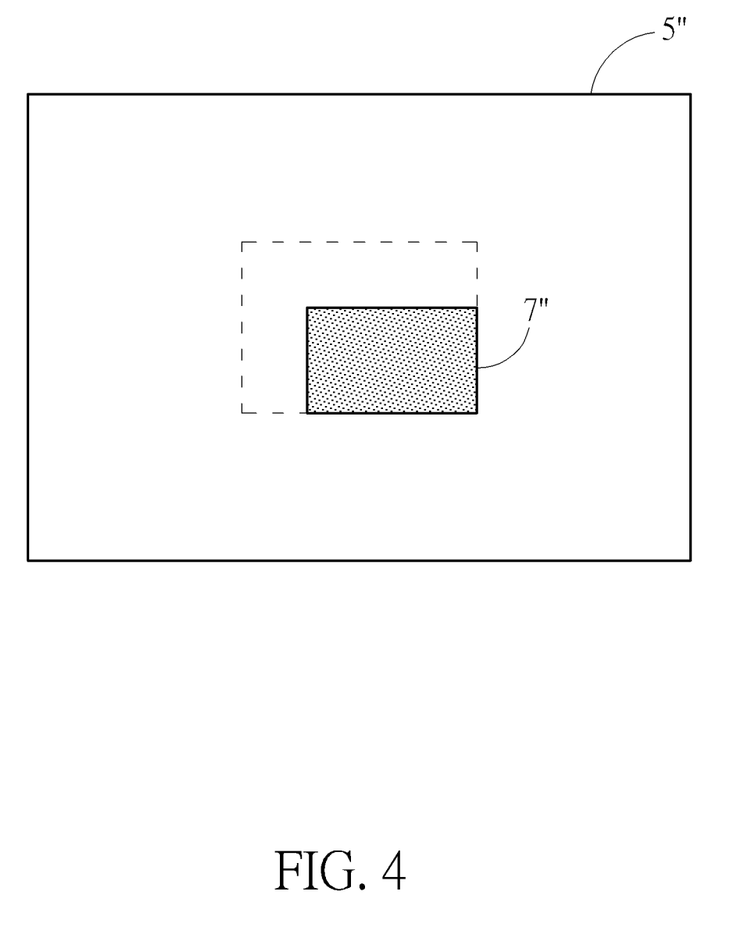
FIG. 4 is a diagram of an output medium outputted by the multi-function apparatus shown in FIG. 3 in the prior art.

Besides, there is another conventional multi-function apparatus capable of outputting an object graphic corresponding to a scanned object at a central position on a sheet of paper or an image file when the multi-function apparatus detects a size of the scanned object is less than a canvas size of the sheet of paper or the image file. However, when the scanned object is not placed on the upper-left corner of the scanning platform, the sensors cannot detect the size of the scanned object correctly. At this moment, the object graphic corresponding to the scanned object cannot be outputted at the central position on the sheet of paper or the image file because of misjudgment of the size of the scanned object. For example, please refer to FIG. 3 and FIG. 4. FIG. 3 is another scanning diagram of a multi-function apparatus 4" in the prior art. FIG. 4 is a diagram of an output medium 5" outputted by the multi-function apparatus 4" shown in FIG. 3 in the prior art. As shown in FIG. 3 and FIG. 4, when a scanned object 6" is not placed on an upper-left corner of a scanning platform 41" of the multi-function apparatus 4", the sensors cannot detect a size of the scanned object 6" correctly and even may misjudge the scanned object has a blank border and has a greater size. At this moment, an object graphic 7" corresponding to the scanned object 6" is outputted at a position away from the central position on the output medium 5", which is not convenient in use.

SUMMARY OF THE DISCLOSURE

Therefore, it is an objective of the present disclosure to provide an image output device, a multi-function apparatus, an image processing module and a related image output method, which are capable of outputting an object graphic at a predetermined position on an output medium, for solving the aforementioned problem.

In order to achieve the aforementioned objective, the present disclosure discloses a multi-function apparatus including a scanning module, a storage module and a printing module. The scanning module is for scanning a scanned object to generate a scanning image having an object graphic corresponding to the scanned object. The storage module is for storing the scanning image. The printing module is for printing the object graphic onto a printing medium. The image processing module is electrically connected to the scanning module, the storage module and the printing module. The image processing module includes an identification unit and a control unit. The identification unit is for identifying the object graphic from the scanning image stored in the storage module to obtain a size of the object graphic. The control unit is for controlling the printing module to print the object graphic at a predetermined position on the printing medium when the control unit determines the size of the object graphic is less than a canvas size of the printing medium.

According to an embodiment of the present disclosure, the predetermined position is a corner position or a central position of the printing medium.

According to an embodiment of the present disclosure, the multi-function apparatus further includes an input module electrically connected to the image processing module for inputting information of the predetermined position.

In order to achieve the aforementioned objective, the present disclosure further discloses an image output device includes a scanning module, a storage module, an output module and an image processing module. The scanning module is for scanning a scanned object to generate a scanning image having an object graphic corresponding to the scanned object. The storage module is for storing the scanning image. The output module is for outputting the object graphic onto an output medium. The image processing module is electrically connected to the scanning module, the storage module and the output module. The image processing module includes an identification unit and a control unit. The identification unit is for identifying the object graphic from the scanning image stored in the storage module to obtain a size of the object graphic. The control unit is for controlling the output module to output the object graphic at a predetermined position on the output medium when the control unit determines the size of the object graphic is less than a canvas size of the output medium.

According to an embodiment of the present disclosure, the image output device further includes an input module electrically connected to the image processing module for inputting information of the predetermined position.

According to an embodiment of the present disclosure, the output module is an image file output module, and the output medium is an image file.

According to an embodiment of the present disclosure, the predetermined position is a corner position or a central position of the output medium.

In order to achieve the aforementioned objective, the present disclosure further discloses an image output method of an image output device. The image output method includes a control unit controlling a scanning module to scan a scanned object to generate a scanning image having an object graphic corresponding to the scanned object and further storing the scanning image into a storage module; an identification unit identifying the object graphic from the scanning image stored in the storage module to obtain a size of the object graphic; and a control unit controlling an output module to output the object graphic at a predetermined position on the output medium when the control unit determines the size of the object graphic is less than a canvas size of the output medium.

According to an embodiment of the present disclosure, the image output method further includes utilizing an input module to input information of the predetermined position.

According to an embodiment of the present disclosure, the control unit controlling the output module to output the object graphic at the predetermined position on the output medium when the control unit determines the size of the object graphic is less than the canvas size of the output medium includes the control unit controlling a printing module to print the object graphic at the predetermined position on a printing medium when the control unit determines the size of the object graphic is less than a canvas size of the printing medium.

According to an embodiment of the present disclosure, the control unit controlling the output module to output the object graphic at the predetermined position on the output medium when the control unit determines the size of the object graphic is less than the canvas size of the output medium includes the control unit controlling the output module to output the object graphic at the predetermined position on an image file when the control unit determines the size of the object graphic is less than a canvas size of the image file.

According to an embodiment of the present disclosure, the predetermined position is a corner position or a central position of the output medium.

In order to achieve the aforementioned objective, the present disclosure further discloses an image processing module adapted for a multi-function apparatus and electrically connected to a scanning module, a storage module and a printing module. The scanning module is for scanning a scanned object to generate a scanning image having an object graphic corresponding to the scanned object. The storage module is for storing the scanning image. The printing module is for printing the object graphic onto a printing medium. The image processing module includes an identification unit and a control unit. The identification unit is for identifying the object graphic from the scanning image stored in the storage module to obtain a size of the object graphic. The control unit is for controlling the printing module to print the object graphic at a predetermined position on the printing medium when the control unit determines the size of the object graphic is less than a canvas size of the output medium.

In summary, the present disclosure utilizes the identification unit for identifying the object graphic from the scanning image stored in the storage module to obtain the size of the object graphic rather than detects a size of the scanned object by a plurality of sensors disposed on a bezel of a scanning platform. Therefore, it is not required to place the scanned object on a designated position, such as an upper-left corner of the scanning platform. Instead, the scanned object can be placed on the scanning platform at will, which is convenient in use and saves manufacturing cost of the sensors.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 5:
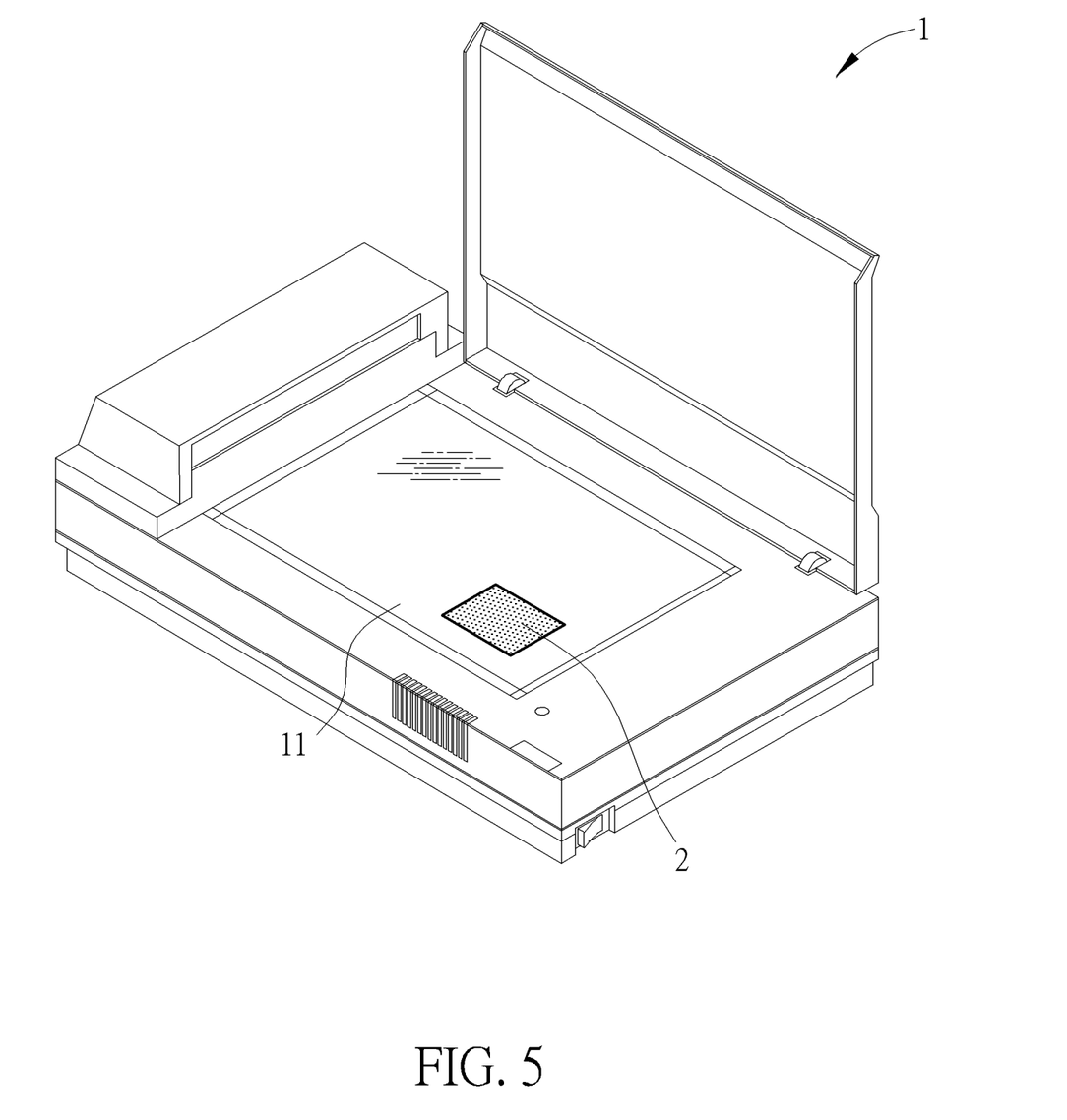
FIG. 5 is a scanning diagram of an image output device according to a first embodiment of the present disclosure.
Figure 6:
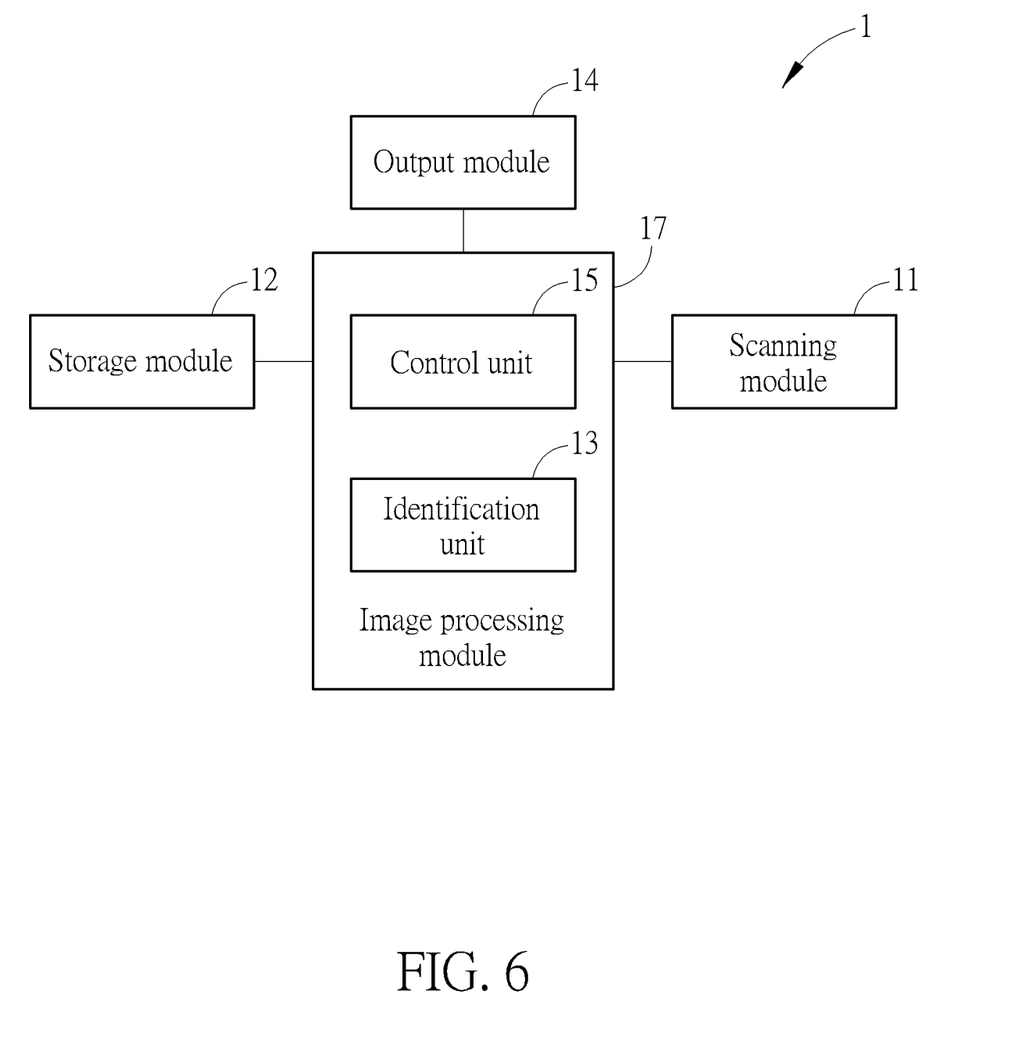
FIG. 6 is a functional block diagram of the image output device according to the first embodiment of the present disclosure.
Figure 7:
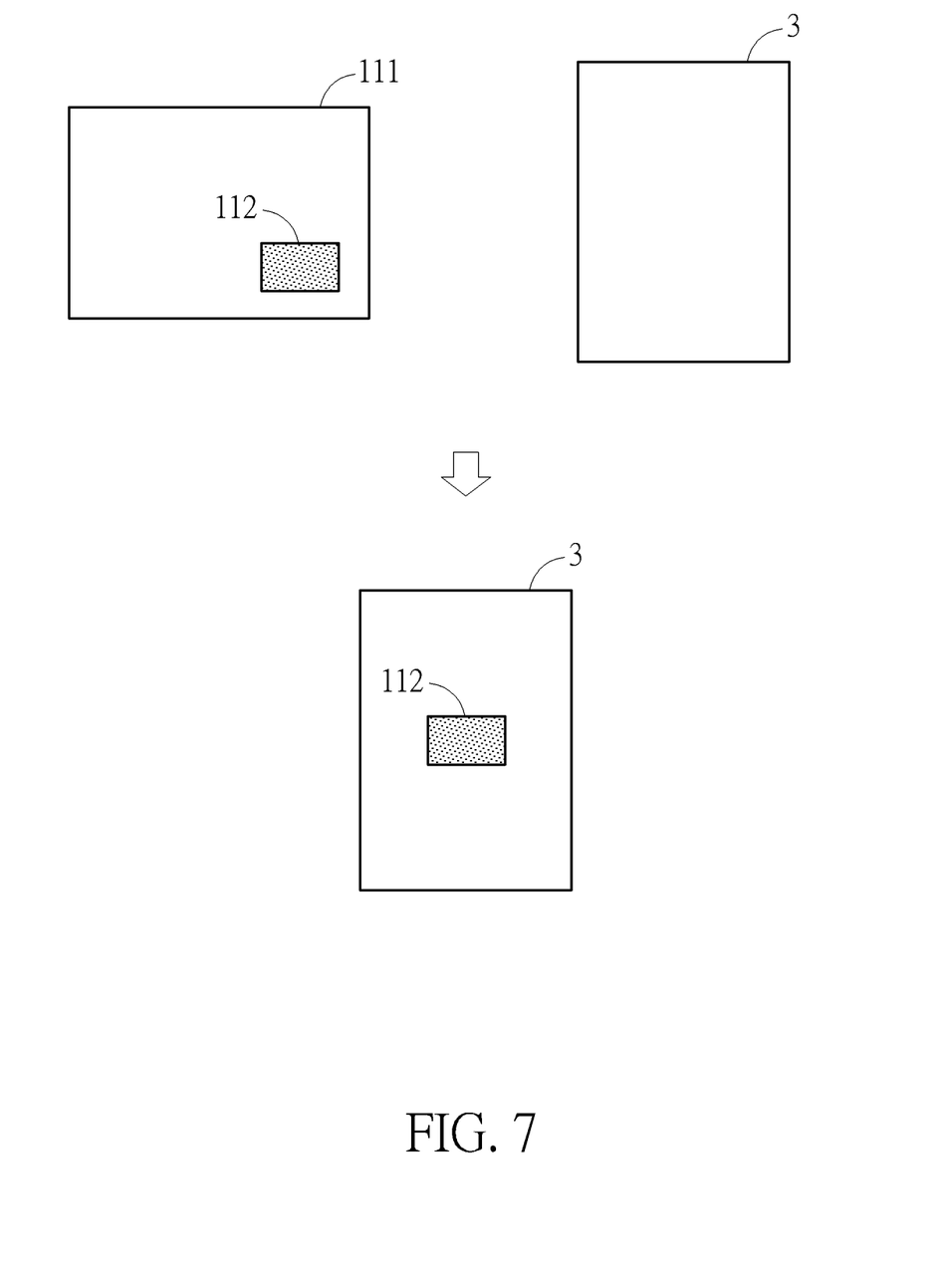
FIG. 7 is a diagram illustrating the image output device outputs an object graphic at a predetermined position on an output medium according to the first embodiment of the present disclosure.

Please refer to FIG. 5 and FIG. 7. FIG. 5 is a scanning diagram of an image output device 1 according to a first embodiment of the present disclosure. FIG. 6 is a functional block diagram of the image output device 1 according to the first embodiment of the present disclosure. FIG. 7 is a diagram illustrating the image output device 1 outputs an object graphic 112 at a predetermined position on an output medium 3 according to the first embodiment of the present disclosure. As shown in FIG. 5 and FIG. 6, the image output device 1 includes a scanning module 11, a storage module 12, an output module 14 and an image processing module 17. The scanning module 11 is for scanning a scanned object 2 to generate a scanning image 111 having the object graphic 112 corresponding to the scanned object 2. The storage module 12 is for storing the scanning image 111. The output module 14 is for outputting the object graphic 112 onto the output medium 3. The image processing module 17 is electrically connected to the scanning module 11, the storage module 12 and the output module 14. The image processing module 17 includes an identification unit 13 and a control unit 15. The identification unit 13 is for identifying the object graphic 112 from the scanning image 111 stored in the storage module 12 to obtain a size of the object graphic 112. The control unit 15 is for controlling the output module 14 to output the object graphic 112 at the predetermined position on the output medium 3 if the control unit 15 determines the size of the object graphic 112 is less than a canvas size of the output medium 3.

In this embodiment, the image output device 1 can be a multi-function apparatus with scanning capability. The scanning module 11 can be a charge coupled device (CCD), a contact image sensor (CIS) or any other optical sensing component. The storage module 12 can be a memory, a hard disk drive or any other storage medium. The image processing module 17 can be a microprocessor, a micro control unit (MCU), a digital signal processor (DSP) or any other processing component in which the identification unit 13 and the control unit 15 are integrated. The output module 14 can be an image file output module of the multi-function apparatus, such as a Bluetooth transmitter or a universal serial bus (USB) connector. The output medium 3 can be an image file. The predetermined position can be a corner position or a central position of the image file. However, it is not limited thereto. For example, in another embodiment, the image output device 1 can be a scanner, and the identification unit 13 and the control unit 15 also can be disposed independently instead of being integrated in the same processor.

Figure 8:
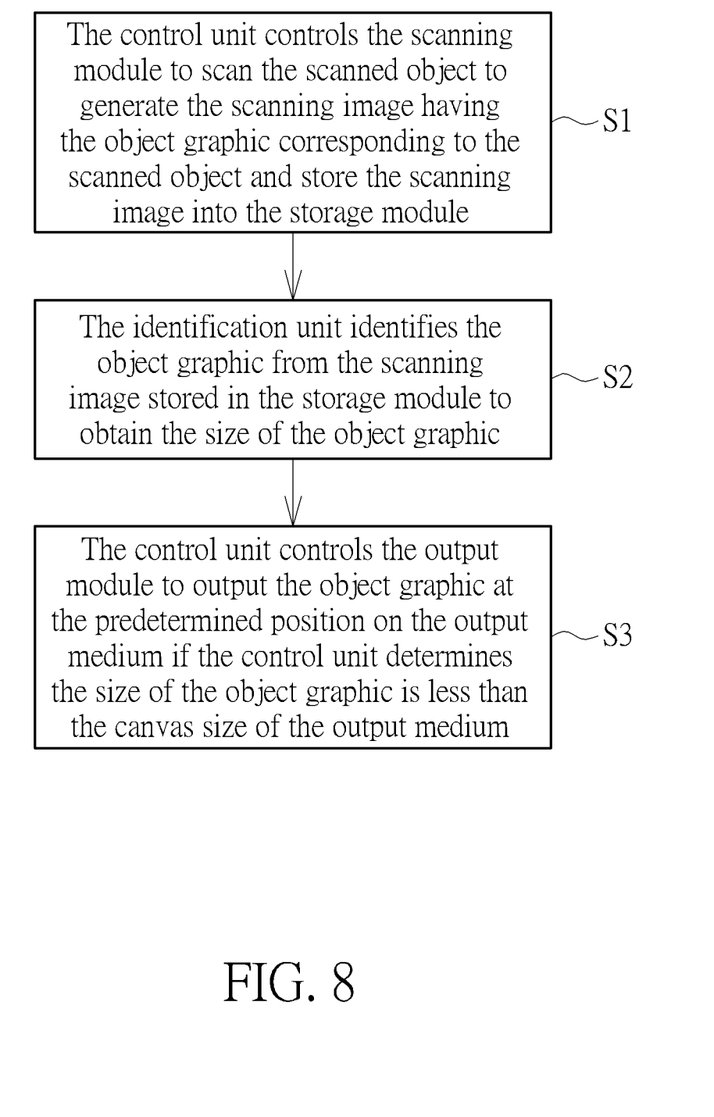
FIG. 8 is a flow chart diagram of an image output method performed by the image output device according to the first embodiment of the present disclosure.
Figure 9:
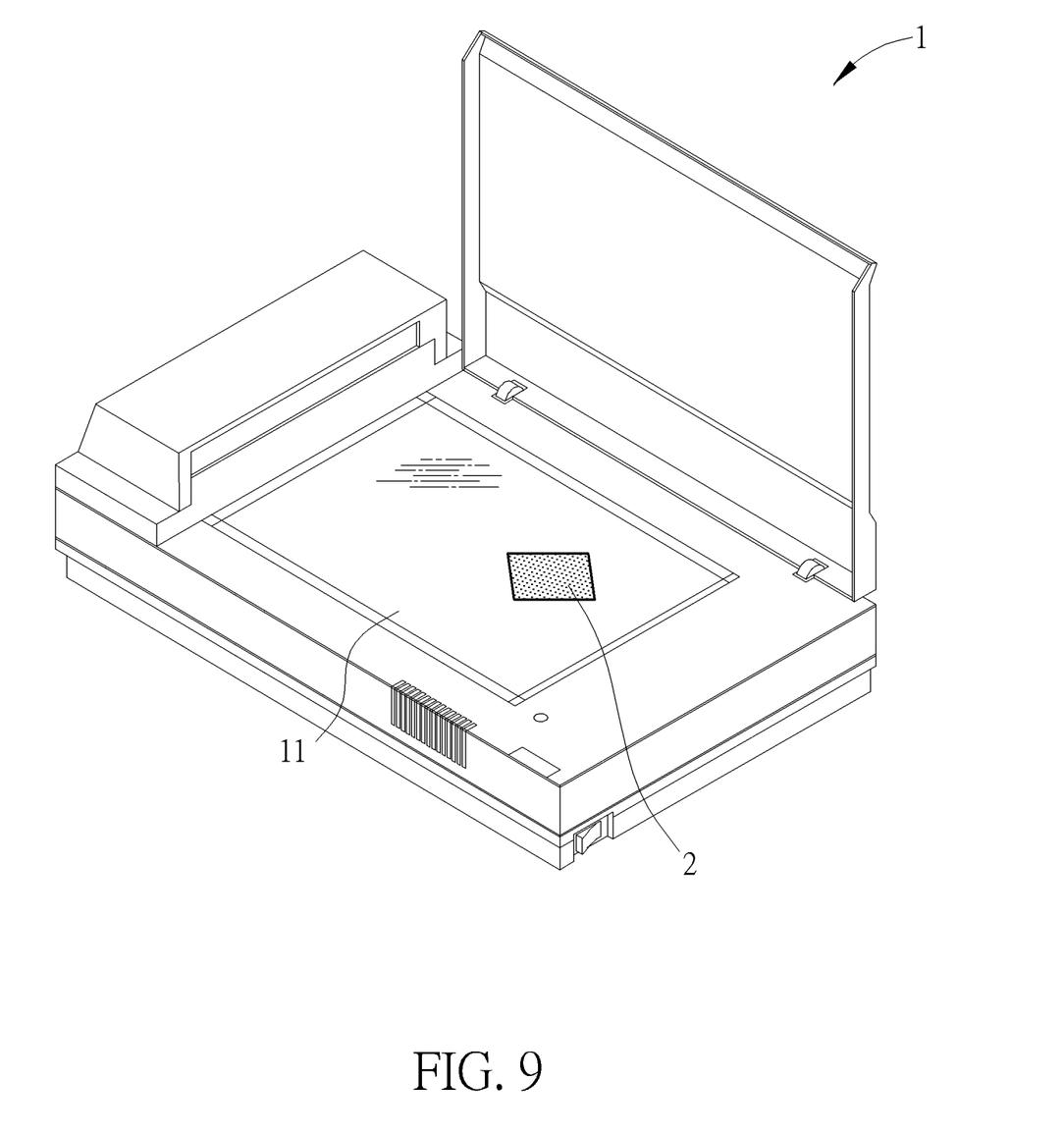
FIG. 9 is another scanning of the image output device according to the first embodiment of the present disclosure.

Please refer to FIG. 8. FIG. 8 is a flow chart diagram of an image output method performed by the image output device 1 according to the first embodiment of the present disclosure. As shown in FIG. 8, the image output method includes the following steps:

S1: The control unit 15 controls the scanning module 11 to scan the scanned object 2 to generate the scanning image 111 having the object graphic 112 corresponding to the scanned object 2 and store the scanning image 111 into the storage module 12;

S2: The identification unit 13 identifies the object graphic 112 from the scanning image 112 stored in the storage module 12 to obtain the size of the object graphic 112; and S3: The control unit 15 controls the output module to output the object graphic 112 at the predetermined position on the output medium 3 if the control unit 15 determines the size of the object graphic 112 is less than the canvas size of the output medium 3.

Figure 13:
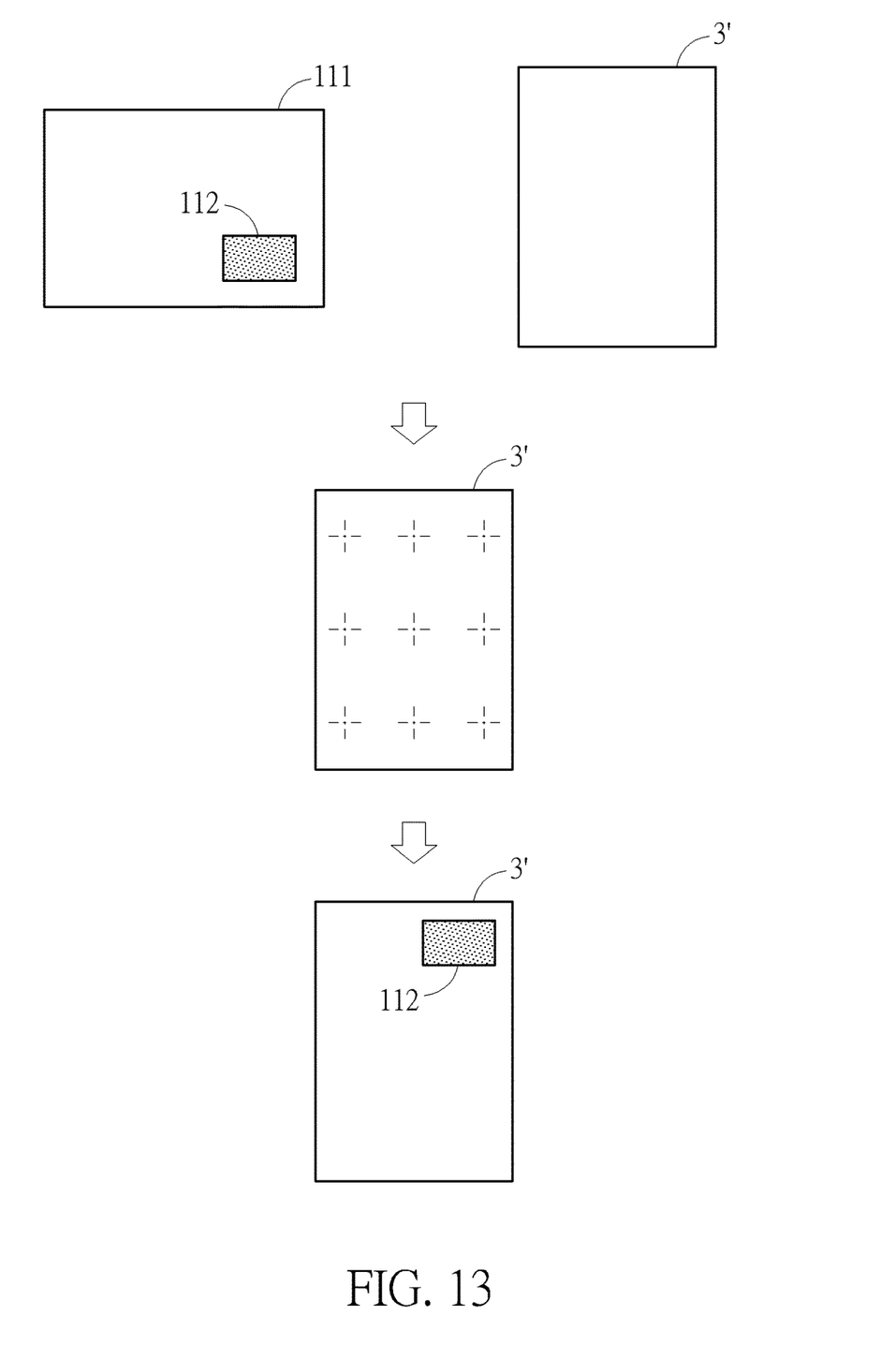
FIG. 13 is a diagram illustrating the multi-function apparatus prints an object graphic at a predetermined position on a printing medium according to the second embodiment of the present disclosure.

Detailed description for the aforementioned steps of the image output method is provided as follows. For example, as shown in FIG. 5, when it is desired to output the scanned object 2 having a smaller size, such as an identification card or a passport, onto the output medium 3 having a larger canvas size, such as an image file at A4 size, a user can place the scanned object 2 on the scanning module 11 at will and operate an user interface to control the scanning module 11 by the control unit 15 to scan the scanned object 2 and then to store the scanning image 111 having the object graphic 112 corresponding to the scanned object 2 into the scanning module 12 (step S1). For example, the user can place the scanned object 2 at a position as shown in FIG. 5. As shown in FIG. 5, an outer periphery of the scanned object 2 and a bezel of a scanning area of the scanning module 12 can be parallel to and spaced from each other. Alternatively, the user also can place the scanned object 2 at another position as shown in FIG. 13. As shown in FIG. 13, the outer periphery of the scanned object 2 and the bezel of the scanning area of the scanning module 12 can be skewed relative to each other. In other words, it is not required to arrange the outer periphery of the scanned object 2 and the bezel of the scanning area of the scanning module in parallel.

After the scanning image 111 is stored into the storage module 12, the identification unit 13 identifies the object graphic 112 from the scanning image 111 stored in the storage module 12 to obtain the size of the object graphic 112 (step S2). For example, the identification unit 13 can identify a boundary between the object graphic 112 and a background image from the scanning image 111 by optical identification, so as to cut the object graphic 112 and determine the size of the object graphic 112. Afterwards, if the control unit 15 determines the size of the object graphic 112 is less than the canvas size of the output medium 3, the control unit 15 can control the output module 14 to output the object graphic 112 at the predetermined position on the output medium 3 as shown in FIG. 7 (step S3). In this embodiment, the control unit 15 can control the output module 14 to output the object graphic 112 at the central position of the output medium 3.

For example, when the canvas size of the output medium 3 is X in a horizontal direction and Y in a vertical direction and the size of the object graphic 112 is x in the horizontal direction and y in the vertical direction, the control unit 15 can control the output module 14 to adjust a position of the object graphic 112 relative to the output medium 3 according to a relation of the canvas size of the output medium 3 and the size of the object graphic 112, so that a horizontal distance between a left boundary of the object graphic 112 and a left boundary of the output medium 3 and a horizontal distance between a right boundary of the object graphic 112 and a right boundary of the output medium 3 respectively can be (X−x)/2, and a vertical distance between an upper boundary of the object graphic 112 and an upper boundary of the output medium 3 and a vertical distance between a lower boundary of the object graphic 112 and a lower boundary of the output medium 3 respectively can be (Y−y)/2. Furthermore, the canvas size of the output medium 3 can be set as a predetermine size. However, in another embodiment, the canvas size of the output medium 3 can be set as a closet canvas size which is selected automatically by the control unit 15 according to the size of the object graphic 112 or be selected by the user manually.

However, the predetermined position of the present disclosure is not limited to the aforementioned embodiment. For example, the predetermined position also can be the corner position of the output medium 3. Besides, the predetermine position not only can be one of built-in positions of the image output device 1 but also can be inputted or changed by the user manually. It depends on practical demands. In other words, the image output device 1 also can further include an input module electrically connected to the image processing module 17 for inputting information of the predetermined position.

Figure 10:
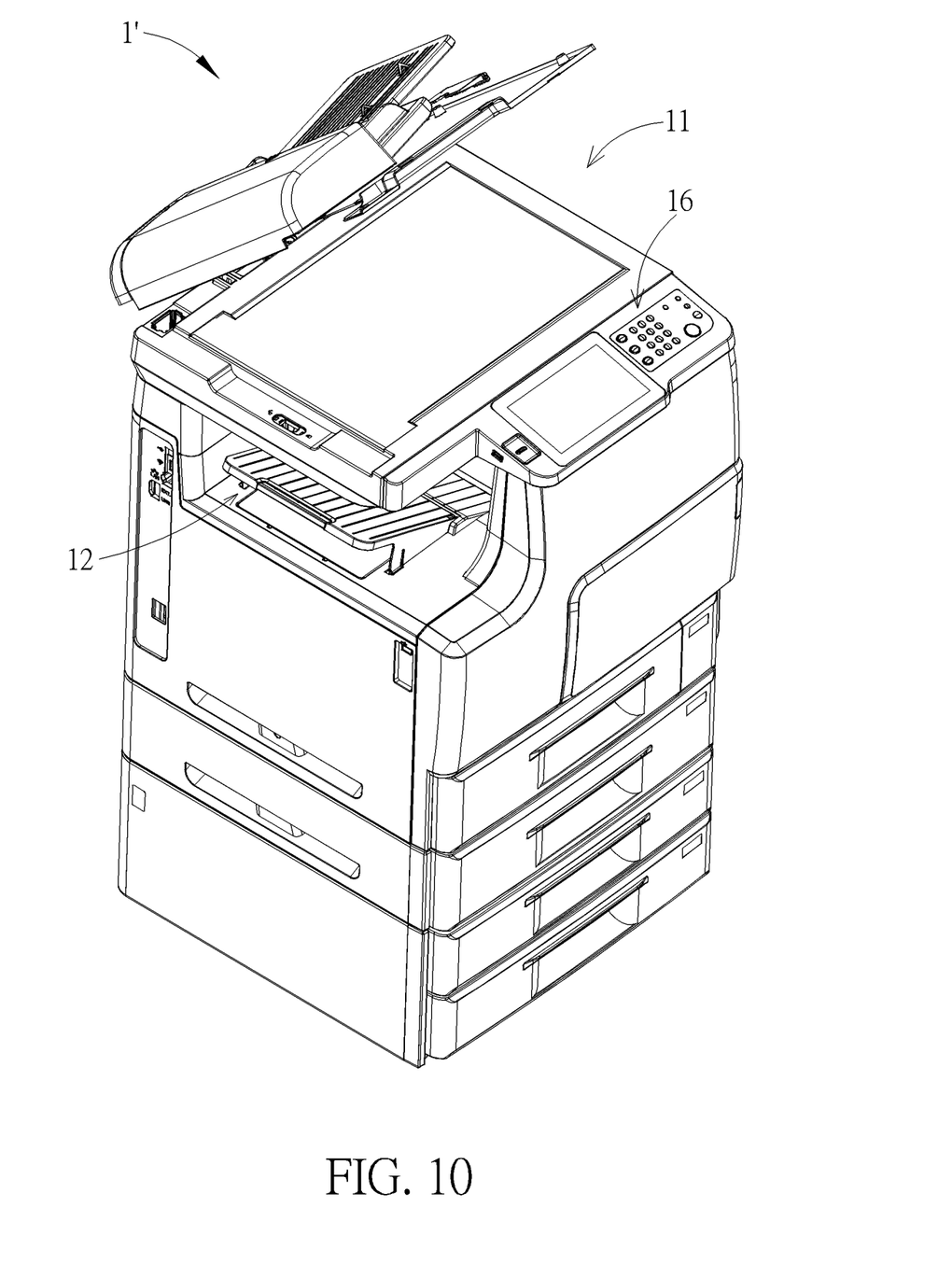
FIG. 10 is a diagram of a multi-function apparatus according to a second embodiment of the present disclosure.
Figure 11:
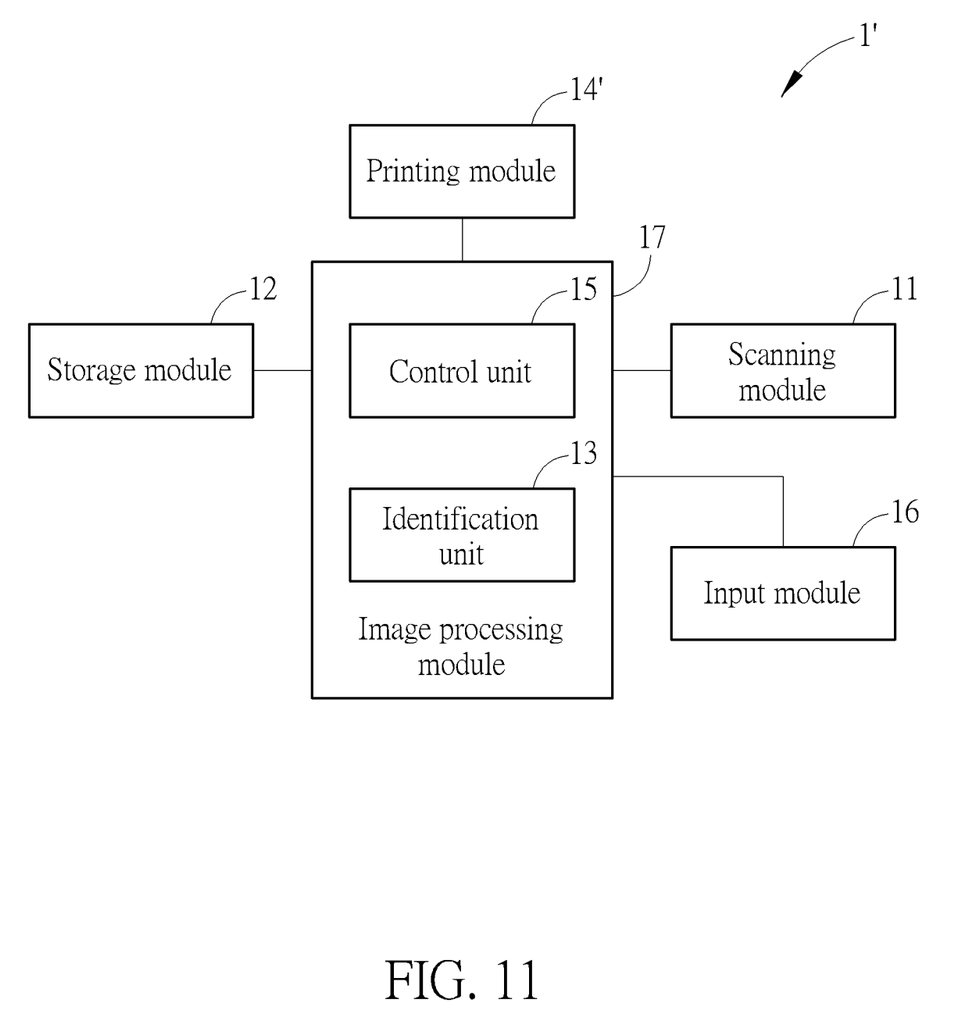
FIG. 11 is a functional block diagram of the multi-function apparatus according to the second embodiment of the present disclosure.
Figure 12:
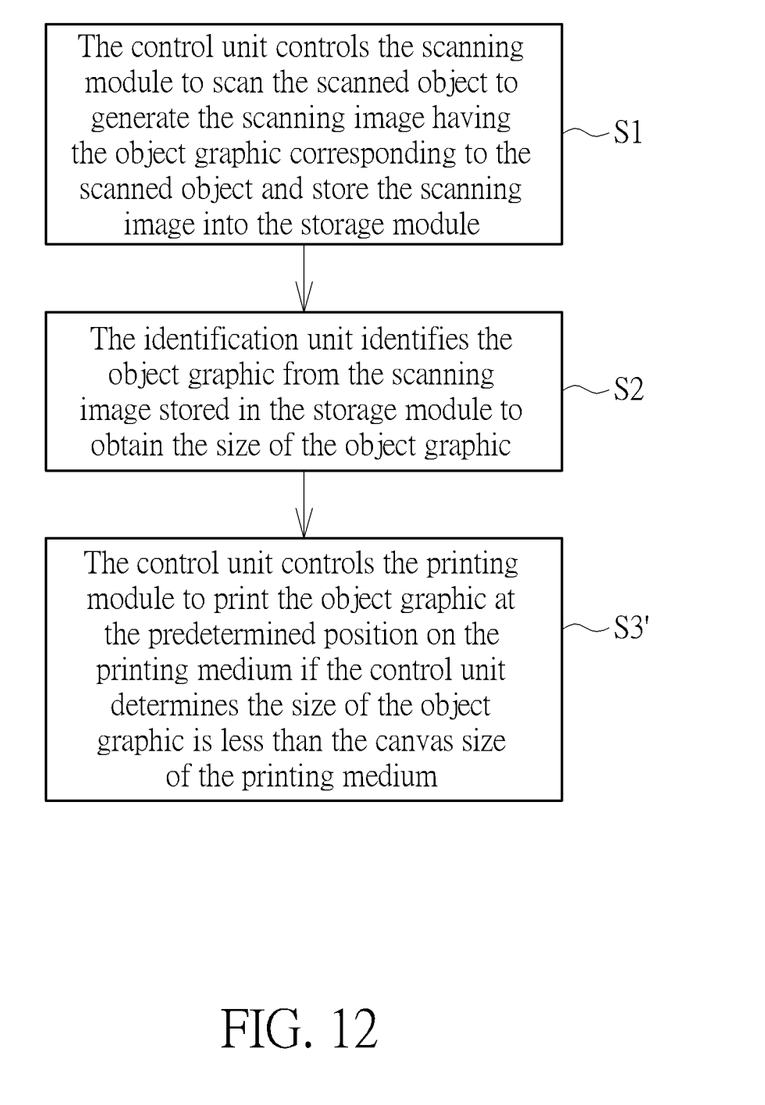
FIG. 12 is a flow chart diagram of an image output method performed by the multi-function apparatus according to the second embodiment of the present disclosure.

Furthermore, please refer to FIG. 10 to FIG. 13. FIG. 10 is a diagram of a multi-function apparatus 1' according to a second embodiment of the present disclosure. FIG. 11 is a functional block diagram of the multi-function apparatus 1' according to the second embodiment of the present disclosure. FIG. 12 is a flow chart diagram of an image output method performed by the multi-function apparatus 1' according to the second embodiment of the present disclosure. FIG. 13 is a diagram illustrating the multi-function apparatus 1' prints an object graphic at a predetermined position on a printing medium according to the second embodiment of the present disclosure. As shown in FIG. 10 to FIG. 13, the multi-function apparatus 1' of this embodiment can be a multi-function apparatus with copying capability, such as a photocopier or a copy machine, and includes the scanning module 11, the storage module 12, the image processing module 17, an input module 16 and a printing module 14'. For simplicity, elements that have the same structures and functions as that illustrated in the aforementioned embodiment are provided with the same item numbers in this embodiment. Detailed description for those elements is omitted herein. The input module 16 is electrically connected to the image processing module 17 and for inputting information of the predetermined position. The printing module 14' is for printing the object graphic 112 onto the printing medium 3'. The printing medium 3' can be a sheet of printing paper. In this embodiment, when the control unit 15 determines the size of the object graphic 112 is less than a canvas size of the printing medium 3', the user can input the information of the predetermined position by the input module 16 to selectively output the object graphic 112 at an upper-left corner position as shown in FIG. 13 or any other position of the printing medium 3' (step S3'). However, it is not limited thereto. The predetermined position can be a built-in position in the multi-function apparatus 1', and therefore, the user does not have to input the information of the predetermined position so that the input module 16 can be omitted.

In contrast to the prior art, the present disclosure utilizes the identification unit for identifying the object graphic from the scanning image stored in the storage module to obtain the size of the object graphic rather than detects a size of the scanned object by a plurality of sensors disposed on a bezel of a scanning platform. Therefore, it is not required to place the scanned object on a designated position, such as an upper-left corner of the scanning platform. Instead, the scanned object can be placed on the scanning platform at will, which is convenient in use and saves manufacturing cost of the sensors.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A multi-function apparatus comprising:
   a scanning module for scanning a scanned object to generate a scanning image having an object graphic corresponding to the scanned object;
   a storage module for storing the scanning image;
   a printing module for printing the object graphic onto a printing medium; and
   an image processing module electrically connected to the scanning module, the storage module and the printing module, the image processing module comprising:
      an identification unit for identifying the object graphic from the scanning image stored in the storage module to obtain a size of the object graphic; and
      a control unit for controlling the printing module to print the object graphic at a predetermined position on the printing medium when the control unit determines the size of the object graphic is less than a canvas size of the printing medium.

2. The multi-function apparatus of claim 1, wherein the predetermined position is a corner position or a central position of the printing medium.

3. The multi-function apparatus of claim 1, further comprising an input module electrically connected to the image processing module for inputting information of the predetermined position.

4. An image output device comprising:
   a scanning module for scanning a scanned object to generate a scanning image having an object graphic corresponding to the scanned object;
   a storage module for storing the scanning image;
   an output module for outputting the object graphic onto an output medium; and
   an image processing module electrically connected to the scanning module, the storage module and the output module, the image processing module comprising:
      an identification unit for identifying the object graphic from the scanning image stored in the storage module to obtain a size of the object graphic; and
      a control unit for controlling the output module to output the object graphic at a predetermined position on the output medium when the control unit determines the size of the object graphic is less than a canvas size of the output medium.

5. The image output device of claim 4, further comprising an input module electrically connected to the image processing module for inputting information of the predetermined position.

6. The image output device of claim 4, wherein the output module is an image file output module, and the output medium is an image file.

7. The image output device of claim 4, wherein the predetermined position is a corner position or a central position of the output medium.

8. An image output method of an image output device, the method comprising:
   a control unit controlling a scanning module to scan a scanned object to generate a scanning image having an object graphic corresponding to the scanned object and further storing the scanning image into a storage module;
   an identification unit identifying the object graphic from the scanning image stored in the storage module to obtain a size of the object graphic; and a control unit controlling an output module to output the object graphic at a predetermined position on the output medium when the control unit determines the size of the object graphic is less than a canvas size of the output medium.

9. The image output method of claim 8, further comprising utilizing an input module to input information of the predetermined position.

10. The image output method of claim 8, wherein the control unit controlling the output module to output the object graphic at the predetermined position on the output medium when the control unit determines the size of the object graphic is less than the canvas size of the output medium comprises the control unit controlling a printing module to print the object graphic at the predetermined position on a printing medium when the control unit determines the size of the object graphic is less than a canvas size of the printing medium.

11. The image output method of claim 8, wherein the control unit controlling the output module to output the object graphic at the predetermined position on the output medium when the control unit determines the size of the object graphic is less than the canvas size of the output medium comprises the control unit controlling the output module to output the object graphic at the predetermined position on an image file when the control unit determines the size of the object graphic is less than a canvas size of the image file.

12. The image output method of claim 8, wherein the predetermined position is a corner position or a central position of the output medium.

13. An image processing module adapted for a multi-function apparatus and electrically connected to a scanning module, a storage module and a printing module, the scanning module being for scanning a scanned object to generate a scanning image having an object graphic corresponding to the scanned object, the storage module being for storing the scanning image, the printing module being for printing the object graphic onto a printing medium, the image processing module comprising:
- an identification unit for identifying the object graphic from the scanning image stored in the storage module to obtain a size of the object graphic; and
- a control unit for controlling the printing module to print the object graphic at a predetermined position on the printing medium when the control unit determines the size of the object graphic is less than a canvas size of the output medium.

* * * * *